(12) United States Patent
Hoory et al.

(10) Patent No.: US 6,785,649 B1
(45) Date of Patent: *Aug. 31, 2004

(54) TEXT FORMATTING FROM SPEECH

(75) Inventors: Ron Hoory, Haifa (IL); Alan Jay Wecker, Moreshet (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,984

(22) Filed: Dec. 29, 1999

(51) Int. Cl.⁷ .............................................. G10L 15/26
(52) U.S. Cl. ...................................................... 704/235
(58) Field of Search ................................ 704/235, 257, 704/260, 267

(56) References Cited

U.S. PATENT DOCUMENTS

| | | | | |
|---|---|---|---|---|
| 4,707,858 A | * | 11/1987 | Fette | 704/251 |
| 5,555,343 A | * | 9/1996 | Luther | 704/260 |
| 5,761,681 A | * | 6/1998 | Huffman et al. | 715/500 |
| 5,842,167 A | * | 11/1998 | Miyatake et al. | 704/260 |
| 5,899,975 A | * | 5/1999 | Nielsen | 704/270.1 |
| 5,933,805 A | * | 8/1999 | Boss et al. | 704/249 |
| 5,940,797 A | * | 8/1999 | Abe | 704/260 |
| 6,035,273 A | * | 3/2000 | Spies | 704/270 |
| 6,175,820 B1 | * | 1/2001 | Dietz | 704/235 |
| 6,260,016 B1 | * | 7/2001 | Holm et al. | 704/260 |

OTHER PUBLICATIONS

"Soft Voice", The Productivity Works, Inc., Trenton, NJ, Oct. 1999, pp. 1–4. (web page: http://www.text2speech.com).

"Via Voice", IBM, Inc., Armonk, NY, Article in *PC Magazine On Line*, Mar. 10, 1998. (web page: http://www.xdnet.com/pcmag/features/speech/rev2.html).

Medan et al., "Super Resolution Pitch Determination of Speech Signals", *IEEE Transactions on Signal Processing*, 39:1, Jan. 1991, pp. 40–48.

W. Hess, *Pitch Determination of Speech Signals*, Springer–Verlag, 1983, pp. 395–450.

* cited by examiner

*Primary Examiner*—Richemond Dorvil
*Assistant Examiner*—Donald L. Storm
(74) *Attorney, Agent, or Firm*—Darby & Darby

(57) ABSTRACT

A method for converting speech to text and vice versa. The method for converting speech to text includes receiving a spoken input having a non-verbal characteristic, and automatically generating a text output, responsive to the spoken input, having a variable format characteristic corresponding to the non-verbal characteristic of the spoken input. The method for converting text to speech includes receiving a text input having a given variable format characteristic and synthesizing speech corresponding to the text input and having a non-verbal characteristic corresponding to the variable format characteristic of the text input.

11 Claims, 6 Drawing Sheets

---

50 → This is being spoken at an average rate, medium volume, and medium pitch.

52 → Some of these words are spoken at a *very fast rate*, some at a *fast rate*, some at a slow rate, and some at a very slow rate.

54 → Some of these words are spoken in a whisper, some quietly, some at a normal volume, some in a loud voice, and some by shouting.

56 → Some of these words are spoken at a low (deep) pitch, some at a normal pitch, and some at a high pitch.

58 → I am first going to talk in a solemn, very slow, portentous voice, at a normal volume, and now I am switching to a high-pitched squeaky whisper, spoken at a normal rate, and finally I am going to shout good bye.

50 → This is being spoken at an average rate, medium volume, and medium pitch.

52 → Some of these words are spoken at a *very fast rate*, some at a *fast rate*, some at a slow rate, and some at a v e r y  s l o w  r a t e.

54 → Some of these words are spoken in a whisper, some quietly, some at a normal volume, some in a loud voice, and some by shouting.

56 → Some of these words are spoken at a low (deep) pitch, some at a normal pitch, and some at a high pitch.

58 → I am first going to talk in a solemn, very slow, portentous voice, at a normal volume, and now I am switching to a high-pitched squeaky whisper, spoken at a normal rate, and finally I am going to shout good*bye*.

FIG. 3

```
I am first going to talk in a {\rtlch \af18\expnd8\expndtw40\dn6 \ltrch
\f43\expnd8\expndtw40\dn6 solemn, very slow, portentous voice, at a normal
volume}\rtlch\ltrch , and now I am switching to a{\rtlch \af18 \ltrch \fs32
}{\rtlch \af18\up6 \ltrch \fs16\up6 high-pitched squeaky whisper, spoken at
a normal rate}{\rtlch \af18 \ltrch \fs16 ,}{\rtlch \af18 \ltrch \fs32
}\rtlch\ltrch and finally I am going to shout{\rtlch \af18 \ltrch \fs32
}{\rtlch \af18\expnd8\expndtw40\up6 \ltrch \f43\fs28\expnd8\expndtw40\up6
good}{\rtlch \ai\af18\expnd-2\expndtw-10\dn6 \ltrch \i\fs32\expnd-
2\expndtw-10\dn6 bye}{\rtlch \af18 \ltrch \fs32 . \par }}
```

TEXT FORMATTING FROM SPEECH

FIELD OF THE INVENTION

The present invention relates generally to converting between text and speech, and specifically to converting speech to text in the presence of speech intonation.

BACKGROUND OF THE INVENTION

Methods for converting between text and speech are known in the art. Text-to-speech conversion methods have been commercially produced for at least fifteen years, with improvements being made to the quality of the products as time has proceeded. Speech-to-text conversion is significantly more difficult to achieve than text-to-speech, and general-purpose, commercial speech-to-text systems have only been available in the last few years.

The Productivity Works, Inc., of Trenton, N.J., produces a "SoftVoice" text-to-speech product known as "SVTTS," which analyzes text into phonemes, and generates speech from the phonemes. SoftVoice is a trademark of SoftVoice Inc. Tags and commands (which are not themselves converted to speech) may be embedded into the text so as to indicate to the SVTTS how the speech is to be generated. For example, there are tags for speaking in an English or Spanish accent, or in a whisper or speaking with a breathy quality.

IBM Corporation of Armonk, New York, produces a speech-to-text software package known as "ViaVoice." ViaVoice is a registered trademark of International Business Machines Corporation. Preferably, the system uses a learning period, during which an operator is able to adjust to the system, and during which a computer upon which the system is installed becomes accustomed to the speech of the operator. During operation, the system converts speech to text, and inter alia, the system may be taught to recognize specific words and output them in a special format. For example, the system may be instructed to convert the spoken word "comma" to the punctuation mark ",".

In an article titled "Super Resolution Pitch Determination of Speech Signals," by Medan et al., in IEEE Transactions on Signal Processing 39:1 (January, 1991), which is incorporated herein by reference, the authors describe an algorithm giving extremely high resolution of pitch value measurements of speech. The algorithm may be implemented in real time to generate pitch spectral analyses.

In a book titled "Pitch Determination of Speech Signals" by W. Hess, (Springer-Verlag, 1983), which is incorporated herein by reference, the author gives a comprehensive survey of available pitch determination algorithms. The author points out that no single algorithm operates reliably for all applications.

SUMMARY OF THE INVENTION

It is an object of some aspects of the present invention to provide improved methods and apparatus for converting speech to text.

In preferred embodiments of the present invention, a speech/text processor automatically converts speech to text, while analyzing one or more non-verbal characteristics of the speech. Such non-verbal characteristics include, for example, the speed, pitch, and volume of the speech. The non-verbal characteristics are mapped to corresponding format characteristics of the text, which are applied by the speech/text processor in generating a text output. Such format characteristics can include, for example, font attributes such as different font faces and/or styles, character height, character width, character weight, character position, spacing between characters and/or words, and combinations of these characteristics. Text with such associated characteristics is herein termed expressive text, and cannot be generated by speech-to-text systems known in the art.

The expressive text produced from the speech may be used, for example, in an electronic mail transmission and/or to produce a hardcopy of the speech. Alternatively, the expressive text may be converted to a marked-up text, by a custom mark-up language or a standard mark-up language, such as HTML (hypertext mark-up language). Associating format characteristics with text to register non-verbal characteristics of speech is an innovative and extremely useful way of converting between speech and text, and overcomes limitations of speech-to-text and text-to-speech methods known in the art.

In some preferred embodiments of the present invention, the expressive text generated by the speech/text processor is converted back to speech by a speech synthesizer. The speech synthesizer recognizes the format characteristics of the expressive text, and applies them to generate speech so as to reproduce the non-verbal characteristics originally analyzed by the speech/text processor. Alternatively, similar format characteristics may be generated using a suitable word processor program, so that text that is input using a keyboard is reproduced by the speech synthesizer with certain desired non-verbal characteristics.

There is therefore provided, in accordance with a preferred embodiment of the present invention, a method for converting speech to text, including:

receiving a spoken input having a non-verbal characteristic; and automatically generating a text output, responsive to the spoken input, having a variable format characteristic corresponding to the non-verbal characteristic of the spoken input.

Preferably, receiving the spoken input includes analyzing the spoken input to identify the non-verbal characteristic.

Preferably, receiving the spoken input includes determining words and boundaries between words, and generating the text output includes generating text corresponding to the words.

Preferably, the non-verbal characteristic includes at least one characteristic of the words selected from a group consisting of a speed, a pitch, and a volume, of the words.

Preferably, receiving the spoken input includes determining parts of words and boundaries between parts of words in the spoken input, and the non-verbal characteristic includes at least one characteristic of the parts of the words selected from a group consisting of a speed, a pitch, and a volume of the parts of the words.

Preferably, generating the text output includes encoding the text output as marked-up text.

Preferably, generating the text output includes generating the text output according to a predetermined mapping between the variable format characteristic and the non-verbal characteristic.

Further preferably, generating the text output includes normalizing a distribution of the non-verbal characteristic over a predetermined quantity of speech according to an adaptive mapping.

Alternatively, generating the text output includes generating the variable format characteristic according to a user-alterable absolute mapping.

Preferably, generating the text output according to the predetermined mapping includes generating the text output according to a quantized mapping, wherein a range of values of the non-verbal characteristic is mapped to a discrete variable format characteristic.

Alternatively, generating the text output according to the predetermined mapping includes generating the text output according to a continuous mapping, wherein a range of values of the non-verbal characteristic is mapped to a range of values of the variable format characteristic.

Preferably, automatically generating the text output includes:
  applying the predetermined mapping at a transmitter;
  encoding the text output with the variable format characteristic as a data bitstream at the transmitter
  transmitting the data bitstream from the transmitter to a receiver; and
  decoding the data bitstream to generate the text output with the variable format characteristic at the receiver.

Preferably, applying the predetermined mapping at the transmitter includes altering the predetermined mapping at the transmitter.

Alternatively, automatically generating the text output includes:
  encoding the text output and the non-verbal characteristic as a data bitstream at a transmitter;
  transmitting the data bitstream from the transmitter to a receiver;
  decoding the data bitstream at the receiver; and
  applying the predetermined mapping at the receiver, responsive to the non-verbal characteristic encoded in the data bitstream, so as to generate the text output with the variable format characteristic.

Preferably, applying the predetermined mapping at the receiver comprises altering the predetermined mapping at the receiver.

Preferably, generating the text output includes varying at least one attribute of the text selected from a group consisting of font face, font style, character height, character width, character weight, character position, character spacing, kerning, fixed pitch, proportional pitch, strikethrough, underline, double underline, dotted underline, bold, bold italic, small capitals, toggle case, all capitals, and color.

Further preferably, generating the text output includes generating a custom-built font for the text output, having one or more variable features used to express the non-verbal characteristic.

There is further provided, in accordance with a preferred embodiment of the present invention, a speech/text processor, which is adapted to receive a spoken input having a non-verbal characteristic and to automatically generate a text output, responsive to the spoken input, having a variable format characteristic corresponding to the non-verbal characteristic of the spoken input.

There is also provided, in accordance with a preferred embodiment of the present invention, a computer software product, including a computer-readable medium in which computer program instructions are stored, which instructions, when read by a computer, cause the computer to receive a spoken input having a non-verbal characteristic and to automatically generate a text output, responsive to the spoken input, having a variable format characteristic corresponding to the non-verbal characteristic of the spoken input.

There is additionally provided, in accordance with a preferred embodiment of the present invention, a method for converting text to speech, including:
  receiving a text input having a given variable format characteristic; and
  synthesizing speech corresponding to the text input and having a non-verbal characteristic corresponding to the variable format characteristic of the text input.

Preferably, receiving the text input includes analyzing the text input to identify the given variable format characteristic.

Preferably, receiving the text input includes analyzing the text input to identify words and parts of words, and synthesizing speech includes synthesizing speech corresponding to the words and parts of words.

Preferably, the non-verbal characteristic includes at least one characteristic of the words selected from a group consisting of a speed, a pitch, and a volume of the words.

Further preferably, the non-verbal characteristic includes at least one characteristic of the parts of the words selected from a group consisting of a speed, a pitch, and a volume of the parts of the words.

Preferably, synthesizing speech includes synthesizing speech according to a predetermined mapping between the variable format characteristic and the non-verbal characteristic.

Further preferably, synthesizing speech according to the predetermined mapping includes generating speech according to a continuous mapping, wherein a range of values of the variable format characteristic is mapped to a range of values of the non-verbal characteristic.

Preferably, receiving the text input includes receiving input in which at least one of the attributes of the text, selected from a group consisting of font face, font style, character height, character width, character weight, character position, character spacing, kerning, fixed pitch, proportional pitch, strikethrough, underline, double underline, dotted underline, bold, bold italic, small capitals, toggle case, all capitals, and color, is varied.

Preferably, receiving the text input includes receiving a text input in a custom-built font having one or more variable features used to express the non-verbal characteristic.

There is further provided, in accordance with a preferred embodiment of the present invention, a speech/text processor, which is adapted to receive a text input having a given variable format characteristic, and to synthesize speech corresponding to the text input and having a non-verbal characteristic corresponding to the variable format characteristic of the text input.

There is additionally provided, in accordance with a preferred embodiment of the present invention, a computer-readable medium in which computer program instructions are stored, which instructions, when read by a computer, cause the computer to receive a text input having a given variable format characteristic, and to synthesize speech corresponding to the text input and having a non-verbal characteristic corresponding to the variable format characteristic of the text input.

The present invention will be more fully understood from the following detailed description of the preferred embodiments thereof, taken together with the drawings, in which:

BRIEF DESCRIPTION OF THE DRAWINGS

FIG. 3 is a diagram showing examples of expressive text produced by the process of FIG. 2, according to a preferred embodiment of the present invention;

FIG. 4 is expressive text which has been formatted in rich text format (RTF), according to a preferred embodiment of the present invention;

DETAILED DESCRIPTION OF PREFERRED EMBODIMENTS

Figure 1:
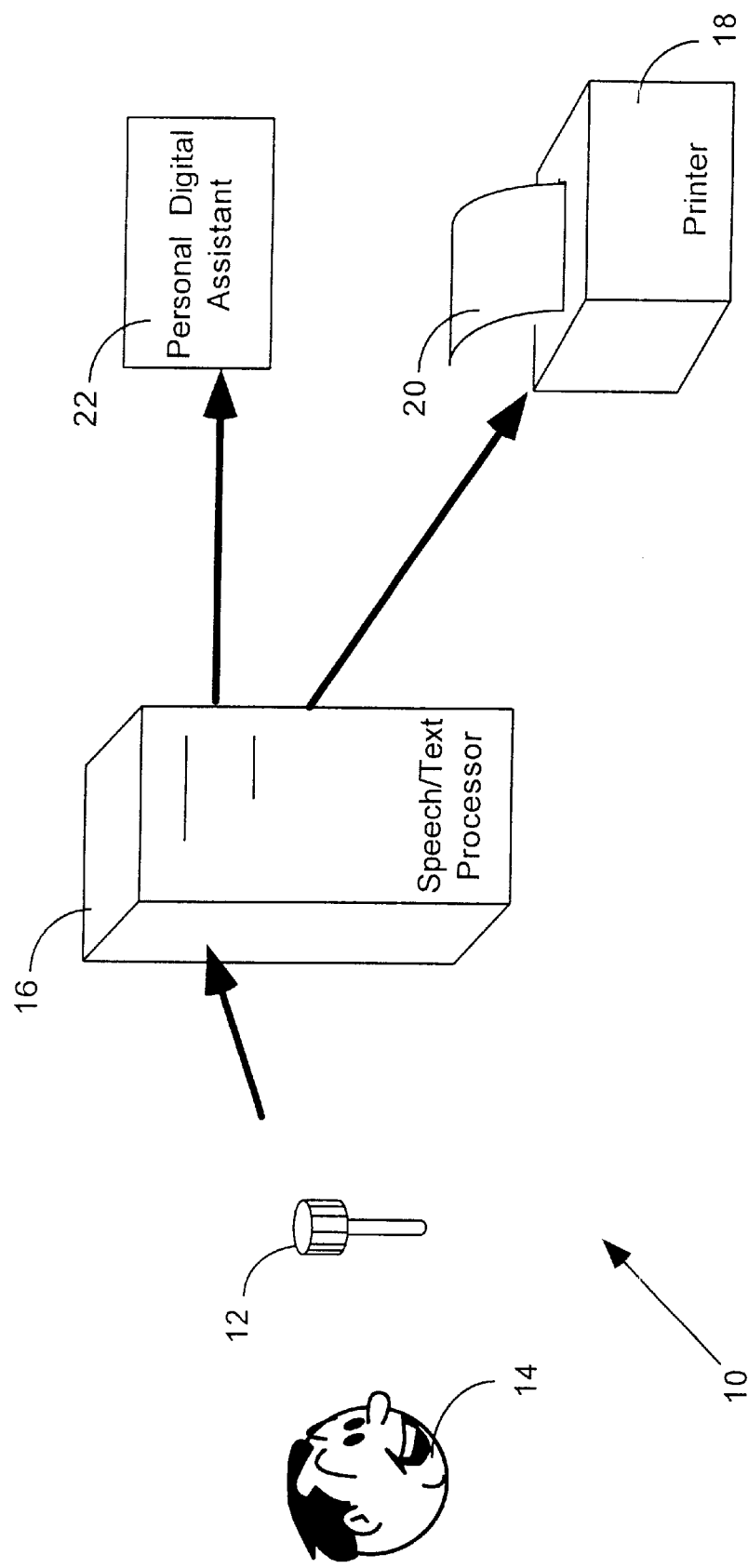
FIG. 1 is a schematic diagram of a system for converting between speech and text, according to a preferred embodiment of the present invention.

Reference is now made to FIG. 1, which is a schematic diagram of a conversion system 10 for converting between speech and text, according to a preferred embodiment of the present invention. A microphone 12 receives speech from a user 14 of system 10, and converts the speech to a corresponding electrical audio signal, by methods known the art. The electrical signal is transmitted by cable or over-the-air to a speech/text processor 16. Processor 16 preferably comprises an industry-standard personal computer having software for performing analyses of speech and/or text as described hereinbelow. The software may be conveyed to processor 16 over a network, or alternatively, it may be supplied in tangible form, for example, on CD-ROM. Alternatively, processor 16 comprises one or more custom or semi-custom or standard devices, or a combination of these devices, which are capable of performing the required analyses of speech.

Processor 16 performs the speech analyses to generate text corresponding to the speech received from microphone 12. In addition, the processor analyzes non-verbal characteristics of the speech. Such non-verbal characteristics include, but are not limited to, the speed, pitch, and volume of the speech. Processor 16 identifies the non-verbal characteristics with corresponding format characteristics of the text, and associates the generated format characteristics with the text. Text with associated format characteristics corresponding to non-verbal characteristics of speech is herein termed expressive text.

After generating expressive text corresponding to the speech, processor 16 preferably encodes the expressive text as marked-up text, most preferably using a standard text markup language such as HTML (hypertext markup language). Processor 16 acts as a transmitter, and transmits the marked-up text to a receiver 22 such as a Personal Digital Assistant (PDA) which is able to decode and output the marked-up text as expressive text. Alternatively or additionally, processor 16 transmits the expressive text to a device which is able to receive the expressive text directly. Optionally, the received expressive text is converted back to speech with non-verbal characteristics corresponding to the characteristics of the expressive text, by a speech synthesizer using the conversion method described below. Further optionally, processor 16 transmits the expressive text to a printer 18, which produces a hardcopy 20 of the expressive text.

Figure 2:
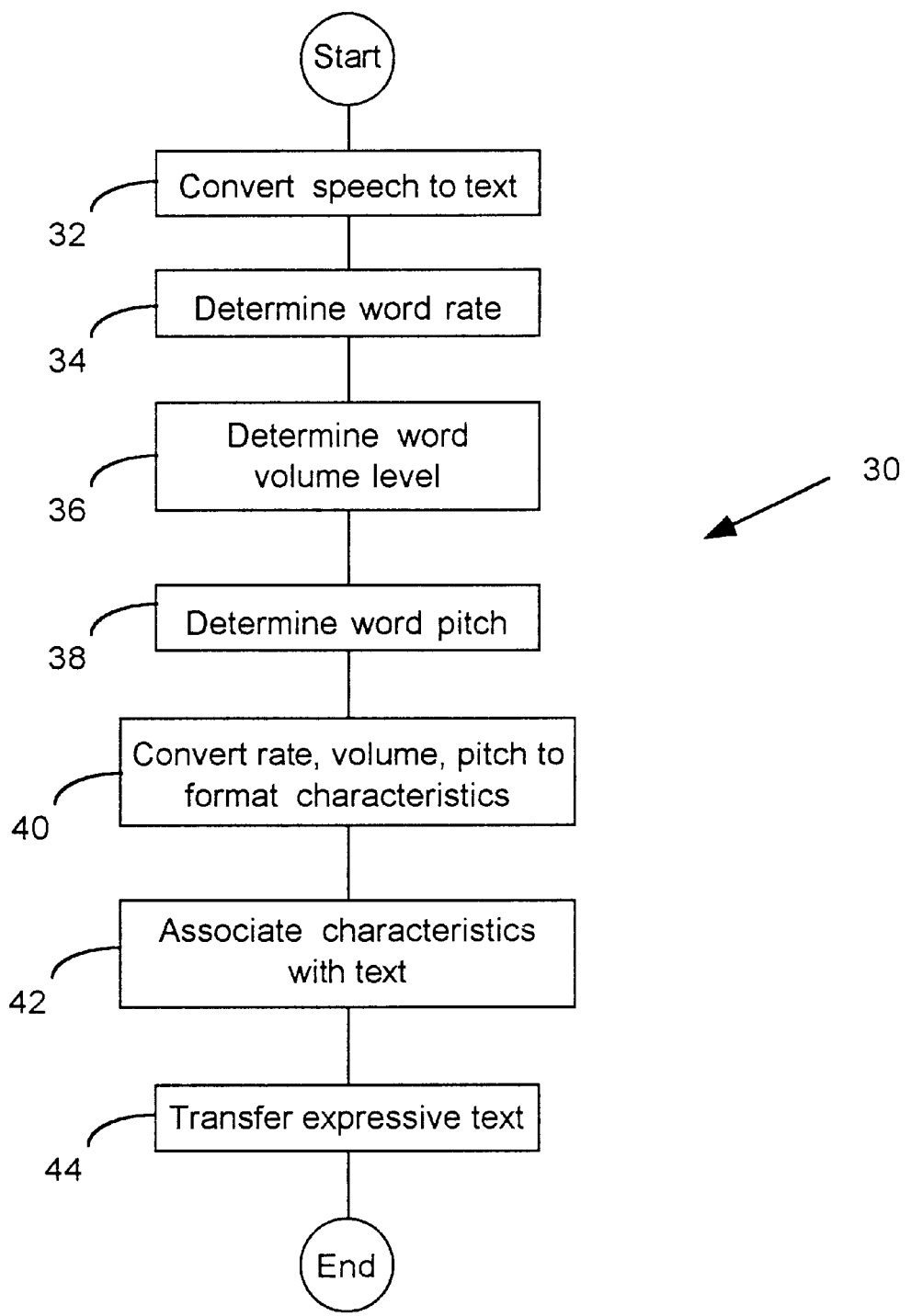
FIG. 2 is a schematic flowchart of a process for converting speech to expressive text, according to a preferred embodiment of the present invention.

FIG. 2 is a schematic flowchart of a speech to expressive text conversion process 30, according to a preferred embodiment of the present invention. In an initial step 32, the speech is converted to text using one of the speech-to-text recognition systems known in the art, for example, the ViaVoice Speech Recognition System. In addition, boundaries between each word spoken in the speech are assigned by the speech-to-text recognition system. Alternatively or additionally, boundaries between each syllable or other part of a word, such as a phoneme, are assigned by the speech-to-text recognition system. Thus, each word or part of a word may be separately analyzed in process 30. While the process described in steps 34 to step 38 hereinbelow applies to a whole word, it will be understood that the process may be applied to any part of a word.

In a rate analysis step 34, a rate of each word is determined. Preferably, the rate of a specific word is calculated by determining a number of phonemes in the word, and finding the rate by dividing the number of phonemes by the time taken to speak the word, as determined by the assigned boundaries of the word. Alternatively, the rate of a specific word is determined by another process known in the art, such as calculating a number of letters per second or a number of syllables per second.

In a volume analysis step 36, a volume level of each word is determined. Preferably, the volume of a specific word is calculated by determining an energy of the word. Most preferably, the energy is determined by finding an average of values of energy peaks in the word. Alternatively, the volume of a specific word is determined by another process known in the art, such as finding a maximum energy produced within the word, or an average of an energy envelope of the word.

In a pitch analysis step 38, a pitch of each word is determined. Preferably, the pitch of a specific word is calculated by determining a pitch frequency of a voiced portion of the word. Most preferably, the pitch frequency is an average of a series of pitch frequency values, determined every fixed time frame within the voiced portion of the word. Alternatively or additionally, the pitch is determined using one of the pitch determination algorithms known in the art, for example, one of the pitch determination algorithms referred to in the Background of the Invention.

In a conversion step 40, the values found in steps 34, 36, and 38 are mapped to corresponding format characteristics, and in an association step 42 the format characteristics found in step 40 are associated with the text generated in step 32. Preferably, the mapping used in step 40 is adaptive, wherein for each of the parameters rate, volume, and pitch, a distribution is respectively normalized over a specific quantity of speech, for example the speech of a complete voicemail message. Alternatively, the mapping is made using an absolute mapping, wherein for each of the parameters a user-alterable table is used to generate respective values of format characteristics. Preferably, the mapping is quantized, so that a range of values of each parameter is mapped to one format characteristic. Alternatively, the mapping is substantially continuous. Continuous mapping and its application is described in more detail below.

Preferably, for quantized mapping, once the rate for the specific word has been determined, the rate is assigned an integral value i between 1 and 5, herein written rate(i), where rate(1) indicates a slowest rate range and rate(5) indicates a highest rate range. Similarly, once the volume for the specific word has been determined, the volume is assigned an integral value j between 1 and 5, herein written volume(j) where volume(1) indicates a lowest volume range and volume(S) indicates a highest volume range. Further similarly, once the pitch for the specific word has been determined, the pitch is assigned an integral value k between 1 and 3, herein written pitch(k) where pitch(1) indicates a lowest pitch range and pitch(3) indicates a highest pitch range.

Table I hereinbelow is a quantized mapping between non-verbal speech characteristics and text format characteristics, according to a preferred embodiment of the present invention.

TABLE I

| Non-Verbal Speech Characteristic | Format Characteristic |
|---|---|
| rate(1) | Times New Roman Backslanted, expanded 2 pt. |
| rate(2) | Times New Roman Backslanted, expanded 1 pt. |
| rate(3) | Times New Roman |
| rate(4) | Times New Roman Italic, compressed 0.5 pt. |
| rate(5) | Times New Roman Italic, compressed 1 pt. |
| volume(1) | 8 pt Times New Roman. |
| volume(2) | 10 pt Times New Roman. |
| volume(3) | 12 pt Times New Roman. |
| volume(4) | 14 pt Times New Roman. |
| volume(5) | 16 pt Times New Roman. |
| pitch(1) | Times New Roman, subscripted 3 pt |
| pitch(2) | Times New Roman |
| pitch(3) | Times New Roman, superscripted 3 pt |

The rate (as determined in step 34 and step 40) is mapped to a font having a sloping form, wherein the spacing between the letters is determined by the value of the rate. Increases in average speech rate from rate(3) are indicated by compressing and italicizing the font. Decreases in average speech rate from rate(3) are indicated by expanding and backslanting the font. Thus, rate(5) and rate(4) words are mapped to italicized Times New Roman text which is respectively condensed by 1 point and 0.5 points, and rate(2) and rate(1) words are mapped to Times New Roman Backslanted text which is respectively expanded by 1 point and 2 points. Similarly, the volume is mapped to the size of the font. Thus, a volume(1) word is assigned a size of 8 points, a volume(5) word is assigned a size of 16 points, and intermediate volumes are assigned point sizes between 8 and 16 points. Further similarly, the pitch is mapped to a position of the font relative to a font baseline. For example, a pitch(1) word is subscripted 3 points below the baseline, a pitch(2) word is not subscripted, and a pitch(3) word is superscripted 3 points above the baseline.

Other mappings similar to those described above with reference to Table I will be apparent to those skilled in the art. Preferably, in order not to impair readability of the text, font characteristics within any specific mapping are based on using one font face or a relatively small number of font faces which are suitable for writing together. It will be appreciated that the mappings shown in Table I are by way of example, and any font characteristics may be used to form the expressive text. For example, characteristics comprising font effects such as kerning, fixed pitch, proportional pitch, strikethrough, underline, double underline, dotted underline, bold, bold italic, small capitals, toggle case, all capitals, and color may be used in combination with or separately from the characteristics used hereinabove. It will be further appreciated that different font faces and/or classes of font faces may be used as format characteristics. For example, one or more serif fonts such as Arial may be used for words assigned low volumes, e.g., having volume(1) or volume(2), and one or more sans serif fonts such as Helvetica may be used for words assigned normal or high volumes, e.g., having volume(3) or volume(4) or volume(5). It will also be appreciated that one or more custom-built fonts may be used to form the expressive text.

FIG. 3 is a diagram showing examples of expressive text produced by step 42, according to a preferred embodiment of the present invention. In the examples shown in FIG. 3, the mapping of Table I has been used. For convenience, unaltered Times New Roman, i.e., Times New Roman which is not italicized, backslanted, subscripted, or superscripted, is herein termed the basic font. Thus expressive text 50, formed from the basic font set at size 12 point, is produced by speaking at a rate(3) volume(3) and pitch(2).

Expressive text 52 comprises text "very fast rate" spoken at rate(5), which text is the basic font compressed by 1 point and italicized. Text "fast rate" is the basic font compressed by 0.5 points and italicized, corresponding to rate(4). Text "slow rate" is the basic font backslanted and expanded by 1 point, corresponding to rate(2), and text "very slow rate" is the basic font backslanted and expanded by 2 points, corresponding to rate(1). The remaining text is set in the basic font, corresponding to rate(3). All the text of expressive text 52 is set at 12 point, corresponding to a volume level volume(3), and is not subscripted or superscripted, corresponding to a pitch level pitch(2).

Expressive text 54 comprises text "whisper" spoken at volume(1), which text is set in the basic font at 8 points, and text "quietly" spoken at volume(2) and set in the basic font at 10 points. Text "loud voice" is spoken at volume(4) and is set in the basic font at 14 points, and text "by shouting" is spoken at volume(5), and is set in the basic font at 16 points. The remaining text in text 54 is set in the basic font, indicating the volume level of the text is spoken at volume (3). Since the only format characteristics associated with text in expressive text 54 are size changes, expressive text 54 is spoken at rate(3) and pitch(2).

Expressive text 56 comprises text "low (deep) pitch" spoken at pitch(1) which text is set in the basic font subscripted by 3 points, and text "high pitch" spoken at pitch(3), which text is set in the basic font superscripted by 3 points. All the remaining text in text 56 is set in the basic font, indicating the pitch of the remaining text is spoken at pitch(2). All of expressive text 56 is set at size 12 point and is not italicized or backslanted, so that expressive text 56 corresponds to volume(3) and rate(3).

Expressive text 58 comprises text wherein combinations of pitches, volumes and rates are present. Text "solemn, very slow, portentous voice, at a normal volume" is set in the basic font subscripted by 3 points, and backslanted and expanded by 2 points, corresponding to speech with non-verbal characteristics of pitch(1), rate(1), and volume(3). Text "high-pitched squeaky whisper, spoken at a normal rate" is set in the basic font at a font size of 8 points superscripted by 3 points, corresponding to speech which has volume(1), pitch(3), and rate(3). Text "goodbye" is an example wherein format characteristics are changed within one word. The syllable "good" is set as the basic font size 14 point, superscripted by 3 points, and backslanted and expanded by 2 points. Thus the non-verbal characteristics of "good" correspond to volume(4), pitch(3), and rate(1). The syllable "bye" is set as the basic font size 16 point, subscripted by 3 points, and italicized and condensed by 0.5 points, so that the non-verbal characteristics of "bye" correspond to volume(5), pitch(1), and rate (4).

FIG. 4 shows marked-up text 60, corresponding to expressive text 58 of FIG. 3, which has been formatted in rich text format (RTF), according to a preferred embodiment of the present invention. As is known in the art, RTF is one of the methods for marking-up text in order to indicate format characteristics. Other forms for marking-up text by tagging the text include MIME (Multipurpose Internet Mail Extensions) and HTML (hypertext markup language). Expressive text may be converted to marked-up text using one of the markup methods known in the art. Alternatively, expressive text may be converted to marked-up text using a custom-designed markup system apparent to one with ordinary skill in the art, for example a subset of markup tags of a standard markup system such as RTF.

Returning to FIG. 2, in a transfer step 44, expressive text as produced in step 42 is transmitted to a receiving device. The expressive text may be transmitted in marked-up form, for example, as described above with reference to FIG. 4.

In some preferred embodiments of the present invention, non-verbal speech characteristics are mapped to format characteristics by continuous mapping. In continuous mapping, a value of a specific non-verbal characteristic, such as rate, is mapped "as is" to a corresponding format characteristic. Thus, as opposed to quantized mapping, a range of values of the non-verbal characteristic is assigned to a range of values of the format characteristic. For example, a range of speeds of words is mapped to a range of angles of slant of italicized text, wherein the range of angles varies between 10° and 30° to the vertical.

In one of these preferred embodiments, when continuous mapping is used, speech is converted to text as described above, and each non-verbal speech characteristic is mapped to a corresponding format characteristic. Each format characteristic is encoded with its associated text. After encoding, format characteristics are transmitted with the text to a suitable receiver which is able to decode the format characteristics and associate them with their corresponding text to form expressive text. Methods for encoding and decoding, using, for example, a standard markup language, or an adaptation of a standard markup language, or a custom-built markup language, will be apparent to those skilled in the art. Suitable receivers include, but are not limited to, programmable devices such as Personal Digital Assistants.

Figure 5:
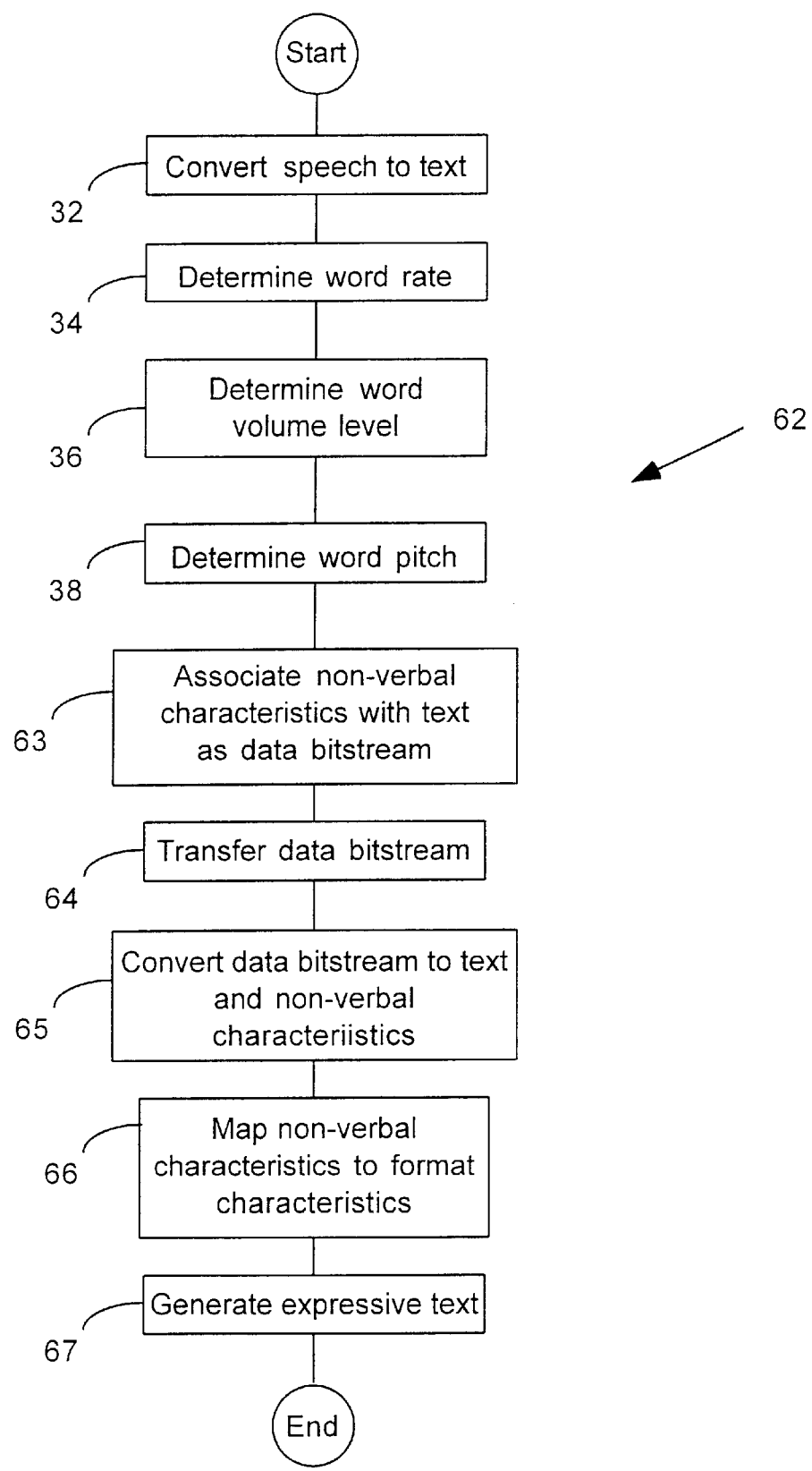
FIG. 5 is a schematic flowchart of an alternative process for converting speech to expressive text, according to a preferred embodiment of the present invention.

FIG. 5 is a schematic flowchart of an alternative process 62 for converting speech to expressive text, according to a preferred embodiment of the present invention. Process 62 comprises steps 32, 34, 36, and 38, described above for process 30, wherein speech is converted to text, and the speech is analyzed for non-verbal characteristics. In an association step 63, each non-verbal characteristic of the speech is associated with its corresponding text. The association may be implemented using a standard or adapted markup language. The result of the association, i.e., the text and the associated non-verbal characteristics, are encoded as a data bitstream by a standard or a custom-built encoding method, as will be apparent to those skilled in the art. In a transfer step 64 the data bitstream is transmitted to a receiver. In a conversion step 65 the receiver recovers the non-verbal characteristics together with the text from the data bitstream. In a mapping step 66 the receiver maps the non-verbal characteristics to corresponding format characteristics. Most preferably, the receiver is able to alter parameters of the mapping used. For example, the receiver has the option of choosing which font or fonts are used in the mapping. In a final step 67 the receiver then associates the format characteristics with their corresponding text to form expressive text.

Figure 6:
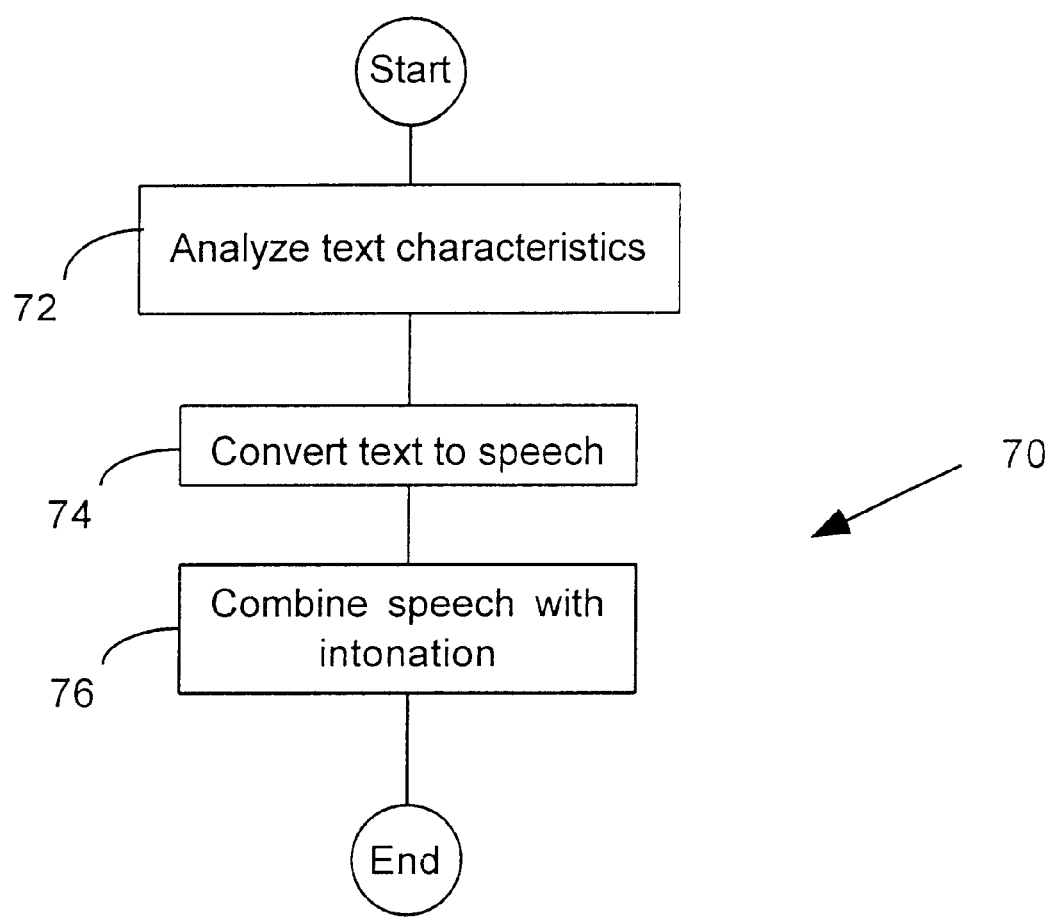
FIG. 6 is a schematic flowchart showing a conversion process from expressive text to speech with non-verbal characteristics, according to a preferred embodiment of the present invention.

FIG. 6 is a schematic flowchart showing a conversion process 70 from expressive text to speech with non-verbal characteristics, according to a preferred embodiment of the present invention. In an analysis step 72, the expressive text is analyzed to determine format characteristics which are associated with the expressive text. In a conversion step 74, the expressive text is converted to speech using one of the methods known in the art, for example, as implemented in the above-mentioned SVTTS system. In a combination step 76, non-verbal speech characteristics, determined according to the mapping of Table I or one of the other mapping methods described above, are added to the speech produced in step 74 to produce synthesized speech with non-verbal characteristics. Preferably, step 76 comprises interpolating and/or smoothing between the non-verbal characteristics produced using the chosen mapping method, to overcome any jerkiness in the synthesized speech.

It will be appreciated that while speech in the above examples has been analyzed for non-verbal characteristics in terms of general physical properties such as pitch, rate, volume, and energy, other methods for analyzing non-verbal characteristics of speech may be utilized. For example, non-verbal characteristics of speech may be analyzed in terms of more subjective criteria such as sibilance, clarity, and accent, which can be associated by processor 16 with certain combinations of physical properties. All such methods of analyzing non-verbal characteristics of speech are considered to be within the scope of the present invention.

It will be further appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for converting speech to text, comprising:
receiving a spoken input having a non-verbal characteristic; and
automatically generating a text output, responsive to the spoken input, having a variable font effect characteristic corresponding to the non-verbal characteristic of the spoken input,
wherein receiving the spoken input comprises determining words and boundaries between words, and wherein generating the text output comprises generating text corresponding to the words,
wherein receiving the spoken input comprises determining parts of words and boundaries between parts of words in the spoken input, and wherein the non-verbal characteristic comprises at least one characteristic of the parts of the words selected from a group consisting of a speed, a pitch, and a volume of the parts of the words.

2. A method for converting speech to text, comprising:
receiving a spoken input having a non-verbal characteristic; and
automatically generating a text output, responsive to the spoken input, having a variable font effect characteristic corresponding to the non-verbal characteristic of the spoken input,
wherein generating the text output comprises generating the text output according to a predetermined mapping between the variable font effect characteristic and the non-verbal characteristic,
wherein generating the text output comprises normalizing a distribution of the non-verbal characteristic over a predetermined quantity of speech according to an adaptive mapping.

3. A method for converting speech to text, comprising:
receiving a spoken input having a non-verbal characteristic; and
automatically generating a text output, responsive to the spoken input, having a variable font effect characteristic corresponding to the non-verbal characteristic of the spoken input, wherein generating the text output comprises generating the text output according to a predetermined mapping between the variable font effect characteristic and the non-verbal characteristic, wherein generating the text output according to the predetermined mapping comprises generating the text output according to a continuous mapping, wherein a range of values of the non-verbal characteristic is mapped to a range of values of the variable font effect characteristic.

4. A method for converting speech to text, comprising:

receiving a spoken input having a non-verbal characteristic; and automatically generating a text output, responsive to the spoken input, having a variable font effect characteristic corresponding to the non-verbal characteristic of the spoken input, wherein generating the text output comprises generating the text output according to a predetermined mapping between the variable font effect characteristic and the non-verbal characteristic, wherein automatically generating the text output comprises:

applying the predetermined mapping at a transmitter;

encoding the text output with the variable font effect characteristic as a data bitstream at the transmitter transmitting the data bitstream from the transmitter to a receiver; and decoding the data bitstream to generate the text output with the variable font effect characteristic at the receiver.

5. A method according to claim 4, wherein applying the predetermined mapping at the transmitter comprises altering the predetermined mapping at the transmitter.

6. A method for converting speech to text, comprising:

receiving a spoken input having a non-verbal characteristic; and automatically generating a text output, responsive to the spoken input, having a variable font effect characteristic corresponding to the non-verbal characteristic of the spoken input, wherein generating the text output comprises generating the text output according to a predetermined mapping between the variable font effect characteristic and the non-verbal characteristic, wherein automatically generating the text output comprises:

encoding the text output and the non-verbal characteristic as a data bitstream at a transmitter;

transmitting the data bitstream from the transmitter to a receiver;

decoding the data bitstream at the receiver; and applying the predetermined mapping at the receiver, responsive to the non-verbal characteristic encoded in the data bitstream, so as to generate the text output with the variable font effect characteristic.

7. A method according to claim 6, wherein applying the predetermined mapping at the receiver comprises altering the predetermined mapping at the receiver.

8. A method for converting speech to text, comprising:

receiving a spoken input having a non-verbal characteristic; and automatically generating a text output, responsive to the spoken input, having a variable font effect characteristic corresponding to the non-verbal characteristic of the spoken input, wherein generating the text output comprises generating a custom-built font for the text output, having one or more variable features used to express the non-verbal characteristic.

9. A speech/text processor, which is adapted to receive a spoken input having a non-verbal characteristic and to automatically generate a text output, responsive to the spoken input, having a variable font effect characteristic corresponding to the non-verbal characteristic of the spoken input, which further encodes as encoded text the text output with the variable font effect characteristic and transmits the encoded text to a receiver which decodes the encoded text.

10. A speech/text processor, which is adapted to receive a spoken input having a non-verbal characteristic and to automatically generate a text output, responsive to the spoken input, having a variable font effect characteristic corresponding to the non-verbal characteristic of the spoken input, and which is adapted to generate the text output according to a predetermined mapping between the variable font effect characteristic and the non-verbal characteristic, which further encodes as encoded text the text output and the non-verbal characteristic and transmits the encoded text to a receiver which decodes the encoded text and applies the predetermined mapping responsive to the non-verbal characteristic encoded in the encoded text.

11. A method for converting text to speech, comprising:

receiving a text input having a given variable font effect characteristic; and synthesizing speech corresponding to the text input and having a non-verbal characteristic corresponding to the variable font effect characteristic of the text input, wherein receiving the text input comprises receiving the text input in a custom-built font having one or more variable features used to express the non-verbal characteristic.

* * * * *

UNITED STATES PATENT AND TRADEMARK OFFICE
CERTIFICATE OF CORRECTION

PATENT NO. : 6,785,649 B1
DATED : August 31, 2004
INVENTOR(S) : Ron Hoory et al.

It is certified that error appears in the above-identified patent and that said Letters Patent is hereby corrected as shown below:

Title page,
Item [54], Title, please delete "TEXT FORMATTING FROM SPEECH" and substitute -- EXPRESSIVE TEXT --.

Signed and Sealed this

Twenty-eighth Day of December, 2004

JON W. DUDAS
*Director of the United States Patent and Trademark Office*